(12) United States Patent
Nomura

(10) Patent No.: US 12,229,364 B2
(45) Date of Patent: Feb. 18, 2025

(54) POSITION DETECTION METHOD OF POINTER AND SENSOR CONTROLLER

(71) Applicant: Wacom Co., Ltd, Saitama (JP)

(72) Inventor: Yoshio Nomura, Saitama (JP)

(73) Assignee: Wacom Co., Ltd., Saitama (JP)

( * ) Notice: Subject to any disclaimer, the term of this patent is extended or adjusted under 35 U.S.C. 154(b) by 192 days.

(21) Appl. No.: 17/878,779

(22) Filed: Aug. 1, 2022

(65) Prior Publication Data

US 2022/0365649 A1    Nov. 17, 2022

Related U.S. Application Data

(63) Continuation of application No. PCT/JP2021/000624, filed on Jan. 12, 2021.

(30) Foreign Application Priority Data

Feb. 10, 2020   (JP) .................................. 2020-020424

(51) Int. Cl.
G06F 3/041      (2006.01)
G06F 3/0354     (2013.01)
G06F 3/038      (2013.01)
G06F 3/044      (2006.01)

(52) U.S. Cl.
CPC ...... G06F 3/04162 (2019.05); G06F 3/03546 (2013.01); G06F 3/0383 (2013.01); G06F 3/04166 (2019.05); G06F 3/04186 (2019.05); G06F 3/0441 (2019.05);
(Continued)

(58) Field of Classification Search
CPC ............. G06F 3/04162; G06F 3/03546; G06F 3/0383; G06F 3/04166; G06F 3/04186; G06F 3/0441; G06F 3/0442; G06F 2203/04104; G06F 2203/04105; G06F 3/03545

See application file for complete search history.

(56) References Cited

U.S. PATENT DOCUMENTS

2013/0328810 A1* 12/2013 Li .................... G06F 3/04883
                                                     345/173
2014/0125628 A1*  5/2014 Yoshida ............... G06F 3/0445
                                                     345/174
(Continued)

FOREIGN PATENT DOCUMENTS

JP    2015/135553 A    7/2015
JP       6473554 B1    2/2019
WO    2018/225204 A1  12/2018

OTHER PUBLICATIONS

International Search Report, mailed Apr. 20, 2021, for International Application No. PCT/JP2021/000624, 4 pages.

*Primary Examiner* — Jonathan A Boyd
(74) *Attorney, Agent, or Firm* — Seed IP Law Group LLP

(57) ABSTRACT

Disclosed is a detection method performed by a sensor controller connected to a sensor including a plurality of sensor electrodes, the method detecting, with use of the sensor, a position of a passive pointer that does not transmit a signal and a position of an active pen that transmits a pen signal from a pen electrode provided on an end of the active pen. The method includes acquiring a pen pressure value indicating pressure applied to a pen tip of the active pen, and controlling an operation mode of the sensor controller according to the pen pressure value.

16 Claims, 10 Drawing Sheets

(52) U.S. Cl.
    CPC .. *G06F 3/0442* (2019.05); *G06F 2203/04104* (2013.01); *G06F 2203/04105* (2013.01)

(56) References Cited

U.S. PATENT DOCUMENTS

| | | | |
|---|---|---|---|
| 2014/0354589 A1* | 12/2014 | Ahn | G06F 3/0416 |
| | | | 345/174 |
| 2015/0242043 A1* | 8/2015 | Oda | G06F 3/0446 |
| | | | 345/174 |
| 2017/0269776 A1* | 9/2017 | Katsurahira | G06F 3/04166 |
| 2020/0081577 A1 | 3/2020 | Nomura et al. | |

* cited by examiner

SPT1 MODE

SPT2 MODE

REVISED SPT2 MODE

EXCLUSIVE MODE

POSITION DETECTION METHOD OF POINTER AND SENSOR CONTROLLER

BACKGROUND

Technical Field

The present disclosure relates to a position detection method of a pointer and a sensor controller, and particularly, to a position detection method of a pointer and a sensor controller for detecting positions of a passive pointer and an active pen.

Background Art

An input system corresponding to both input with an active capacitive electronic pen (hereinafter, referred to as an "active pen") and input with a finger or an auxiliary device that does not transmit a signal similarly to the finger (hereinafter, collectively referred to as a "passive pointer") is known. Note that position detection of the passive pointer is performed by detecting capacitive coupling between a front end of the passive pointer and a sensor electrode arranged in a panel surface. Hereinafter, the input with the active pen will be referred to as "pen input," and the input with the passive pointer will be referred to as "touch input." This type of input system is generally configured to detect, in time division, the positions of the active pen and the passive pointer on the panel surface and supply the positions to an operating system.

An example of such an input system is disclosed in Japanese Patent No. 6473554. The input system described in Japanese Patent No. 6473554 is configured to divide the position detection of the passive pointer for one panel surface into two or more parts. This is for allowing the position detection of the active pen at a high detection rate and at equal intervals. A technique of mutually using a detection result of the passive pointer and a detection result of the active pen to prevent false detection of the passive pointer and the active pen is also disclosed in Japanese Patent No. 6473554.

Meanwhile, the inventor of the present application is examining stopping the position detection of the passive pointer when the active pen is detected, in order to obtain a higher detection rate of the position of the active pen than in the example of Japanese Patent No. 6473554 described above. Hereinafter, an operation mode of the input system for detecting the positions of the active pen and the passive pointer in time division will be referred to as an "SPT (Simultaneous Pen Touch) mode," and an operation mode of the input system for stopping the position detection of the passive pointer and detecting only the position of the active pen will be referred to as an "exclusive mode."

However, if the input system is switched to the exclusive mode when the active pen is detected, it is obvious that the touch input cannot be performed when the active pen is detected. Accordingly, the touch input cannot be performed when the active pen is very close to the panel surface. Therefore, part of the operation becomes inconvenient for the user, such as when the user separates the pen tip a little from the panel surface during the pen input with the right hand and performs a pinch-out operation with the left hand during the separation (gesture operation of gradually increasing the distance between two fingers) to expand the display.

BRIEF SUMMARY

Therefore, an object of the present disclosure is to provide a position detection method of a pointer for allowing touch input when an active pen is very close to a panel surface while an exclusive mode is used.

The false detection of the passive pointer and the active pen can be prevented by mutually using the detection result of the passive pointer and the detection result of the active pen as described in Japanese Patent No. 6473554. However, if the input system is switched to the exclusive mode, the detection of the passive pointer is not performed, and the false detection prevention does not function.

Therefore, another object of the present disclosure is to provide a position detection method of a pointer that can use a false detection prevention function as long as possible while an exclusive mode is used.

The present disclosure provides a pointer position detection method performed by a sensor controller connected to a sensor including a plurality of sensor electrodes, the method detecting, with use of the sensor, a position of a passive pointer that does not transmit a signal and a position of an active pen that transmits a pen signal from a pen electrode provided on a front end part. The method includes acquiring a pen pressure value indicating pressure applied to a pen tip of the active pen, and controlling an operation mode of the sensor controller according to the pen pressure value. The controlling includes: setting the operation mode of the sensor controller to a first operation mode of detecting, in time division, the position of the active pen and the position of the passive pointer on a panel surface when the pen pressure value indicates that the pen tip is not in contact with the panel surface, and setting the operation mode of the sensor controller to a second operation mode of detecting the position of the active pen on the panel surface and not detecting the position of the passive pointer on the panel surface when the pen pressure value indicates that the pen tip is in contact with the panel surface.

The present disclosure provides a sensor controller that uses a sensor including a plurality of sensor electrodes to detect a position of a passive pointer that does not transmit a signal and a position of an active pen that transmits a pen signal from a pen electrode provided on a front end part, the sensor controller including a processor, and a memory storing instruction that, when executed by the processor, cause the sensor controller to acquire a pen pressure value indicating pressure applied to a pen tip of the active pen, enter a first operation mode of detecting, in time division, the position of the active pen and the position of the passive pointer on a panel surface when the pen pressure value indicates that the pen tip is not in contact with the panel surface, and enter a second operation mode of detecting the position of the active pen on the panel surface and not detecting the position of the passive pointer on the panel surface when the pen pressure value indicates that the pen tip is in contact with the panel surface.

According to the present disclosure, the sensor controller operates in the first operation mode (SPT mode) until the pen tip of the active pen comes into contact with the panel surface. This allows the touch input when the active pen is very close to the panel surface while the second operation mode (exclusive mode) is used, and the false detection prevention function can be used as long as possible.

BRIEF DESCRIPTION OF THE SEVERAL VIEW OF THE DRAWINGS

DETAILED DESCRIPTION

An embodiment of the present disclosure will now be described in detail with reference to the attached drawings.

Figure 1:
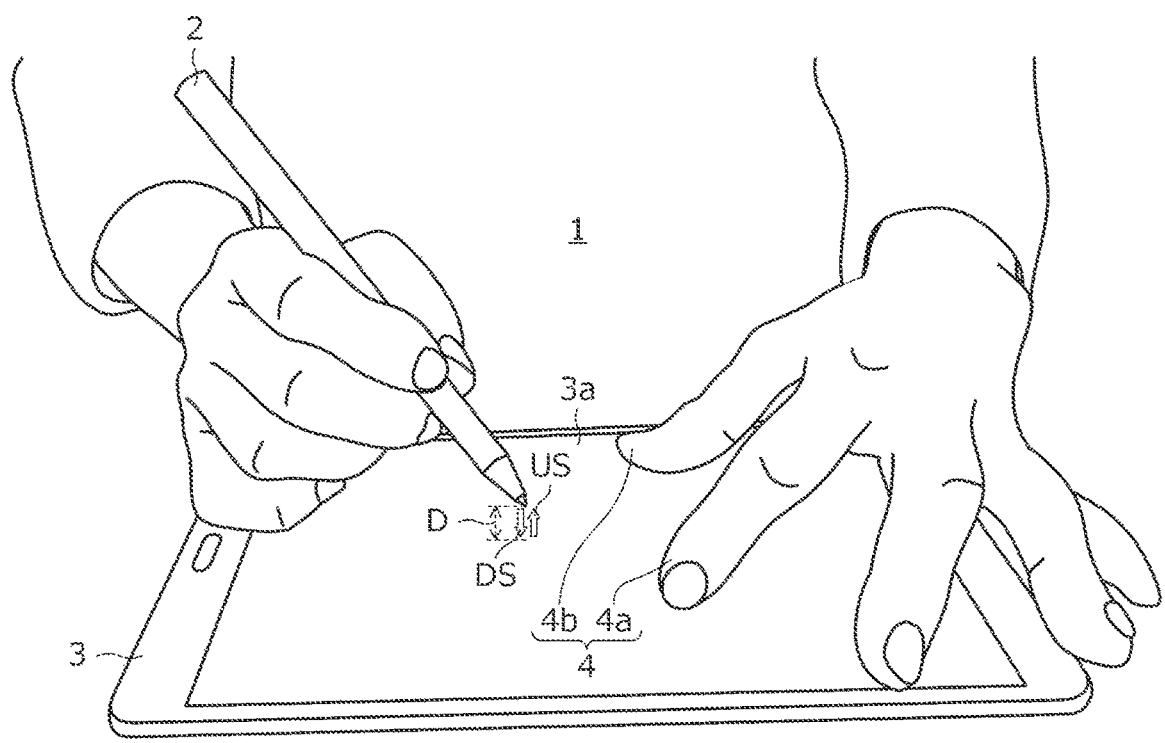
FIG. 1 depicts an example of a configuration and usage of an input system according to an embodiment of the present disclosure.

FIG. 1 depicts an example of a configuration and usage of an input system 1 according to the embodiment of the present disclosure. The input system 1 is an input system corresponding to both the pen input and the touch input, and the input system 1 includes an active pen 2, a tablet terminal 3 including a touch surface 3a (panel surface), and a passive pointer 4. Fingers 4a and 4b illustrated in FIG. 1 are examples of the passive pointer 4. In the following description, the active pen 2 and the passive pointer 4 will be collectively referred to as a "pointer" in some cases.

In the example illustrated in FIG. 1, the user uses the fingers 4a and 4b of the left hand to perform a pinch-out operation while holding the pen 2 with the right hand and floating the pen tip a little. Such a situation may arise when, for example, the user performs the pinch-out operation to expand the input field displayed on the screen and then performs the pen input in the input field. When the user is floating the pen tip of the pen 2 a little, a distance D between the pen tip and the touch surface 3a (to be exact, a sensor 30 described later) is generally shorter than a maximum reach of a downlink signal DS (described later) transmitted by the pen 2. Therefore, the tablet terminal 3 can detect the active pen 2, and the pinch-out operation cannot be performed if the input system 1 is operating in the exclusive mode. An object of the present disclosure is to eliminate such inconvenience by allowing the touch input when the active pen 2 is very close to the touch surface 3a while the exclusive mode is used.

The active pen 2 is an electronic pen operated by an active capacitive system. Although not illustrated, a control circuit and a transmission and receiver are provided in the active pen 2, and the control circuit can transmit and receive signals to and from the tablet terminal 3 through the transmission and receiver (e.g., transceiver). The signal transmitted from the tablet terminal 3 toward the active pen 2 will be referred to as an uplink signal US, and the signal (pen signal) transmitted from the active pen 2 toward the tablet terminal 3 will be referred to as a downlink signal DS.

A pen electrode is provided on a front end part of the active pen 2, and the transmission and receiver of the active pen 2 receives the uplink signal US and transmits the downlink signal DS through the capacitance formed between the pen electrode and the sensor 30 (see FIG. 2 described later) provided in the touch surface 3a of the tablet terminal 3. Note that the pen electrode for receiving the uplink signal US and the pen electrode for transmitting the downlink signal DS may be different or may be the same.

The active pen 2 further includes a pen pressure detection circuit that detects pressure (pen pressure) applied to the pen tip, a side switch state detection circuit that detects an on-off state of a side switch provided on the side surface, a storage device (memory) that stores a unique identifier (ID) allocated in advance, and a power supply circuit (battery) that supplies an operation power source of the active pen 2. The control circuit of the active pen 2 can controls these components.

The tablet terminal 3 is an electronic device having both a function of a liquid crystal apparatus and a function of a position detector that detects the position of the pointer on the touch surface 3a. The touch surface 3a is provided on a liquid crystal display screen. The pointers that can be detected by the tablet terminal 3 include both the active pen 2 and the passive pointer 4 (fingers 4a and 4b) illustrated in FIG. 1.

Figure 2:
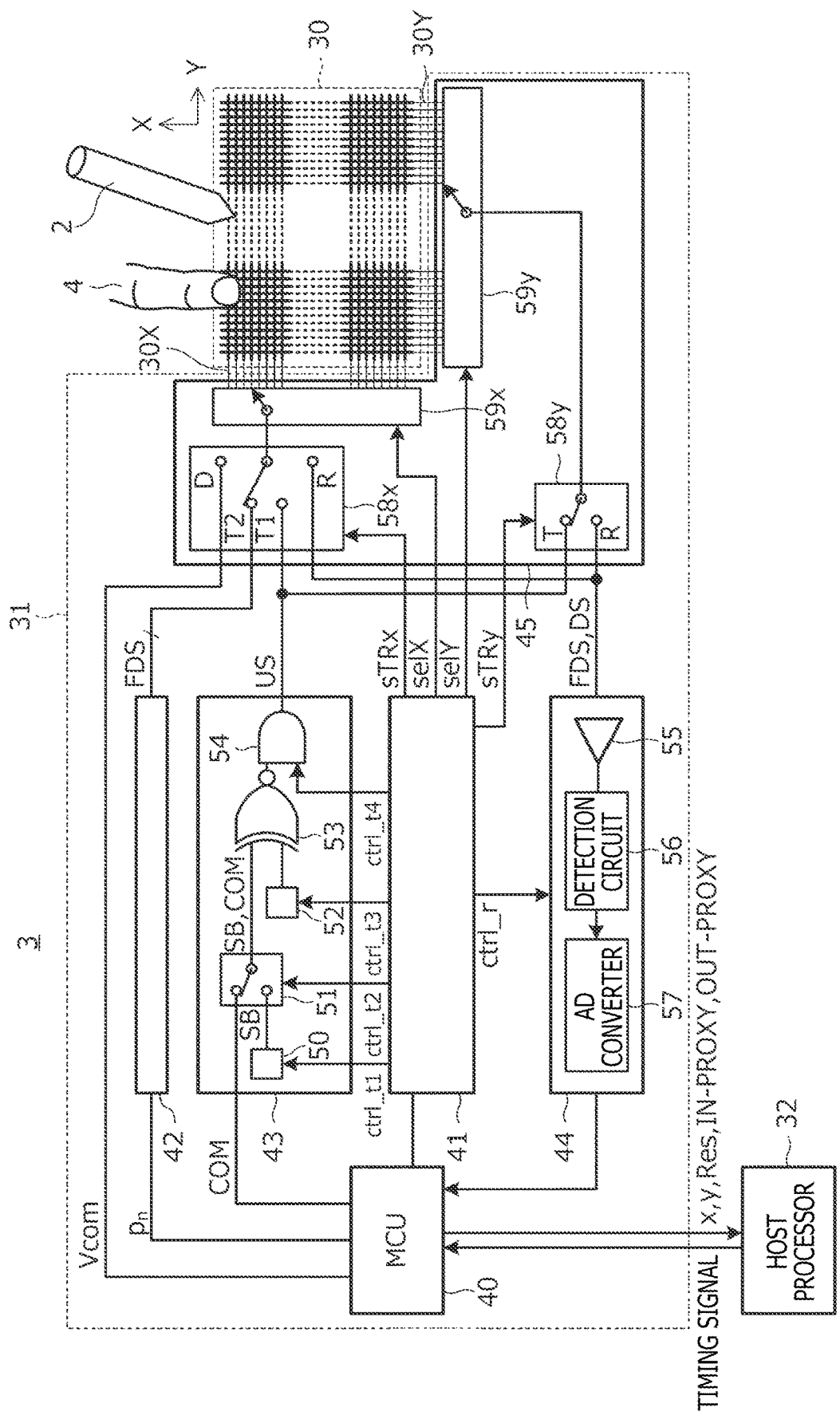
FIG. 2 depicts an internal configuration of a tablet terminal illustrated in FIG. 1.

FIG. 2 depicts an internal configuration of the tablet terminal 3. As illustrated in FIG. 2, the tablet terminal 3 includes the sensor 30, a sensor controller 31, and a host processor 32. Although not illustrated, the tablet terminal 3 further includes a display.

The sensor 30 includes a plurality of sensor electrodes 30X and 30Y arranged in the touch surface 3a. The tablet terminal 3 is what is generally called "in-cell" electronic device, and the plurality of sensor electrodes 30X are also used as electrodes for display (for example, common electrodes of a liquid crystal display). However, the present disclosure can also be similarly applied to a type of electronic device (non-in-cell electronic device) in which the plurality of sensor electrodes 30X and 30Y are independent of the electrodes for display.

The sensor controller 31 is an integrated circuit that detects the positions of the active pen 2 and the passive pointer 4 on the touch surface 3a when the plurality of sensor electrodes 30X are not used for driving the pixels, that is, by using intervals between pixel drive operations. Every time the sensor controller 31 detects the position of the active pen 2 or the passive pointer 4, the sensor controller 31 outputs, to the host processor 32, coordinates indicating the detected position.

The sensor controller 31 is also configured to use the intervals between the pixel drive operations to receive various types of data from the active pen 2. The various types of data received in this way include the data (pen pressure value) indicating the pen pressure detected by the pen pressure detection circuit described above, the data (switch data) indicating the on-off state of the side switch acquired by the side switch state detection circuit, the unique ID stored in the storage device, and the like. The sensor controller 31 is configured to output the received data to the host processor 32.

The host processor 32 is a central processing unit of the tablet terminal 3, and the host processor 32 executes programs stored in a memory not illustrated to execute an operating system of the tablet terminal 3 and various applications such as drawing software. The drawing software includes a function of generating stroke data on the basis of coordinates sequentially supplied from the sensor controller 31 to render and display the stroke data on the display, and a function of adjusting the results of the rendering on the basis of data, such as pen pressure value, supplied from the sensor controller 31 (for example, a function of adjusting the line width according to the pen pressure value).

FIGS. 3A to 3D depict operation modes of the sensor controller 31. The sensor controller 31 is configured to operate in any one of an SPT1 mode (third operation mode) illustrated in FIG. 3A, an SPT2 mode (first operation mode) illustrated in FIG. 3B, and an exclusive mode (second operation mode) illustrated in FIG. 3D. However, a revised SPT2 mode illustrated in FIG. 3C may be used instead of the SPT2 mode. Although each pointer is continuously detected without interruption in the drawings of FIGS. 3A to 3D, the intervals between the pixel drive operations are used for the actual detection as described above, and there are appropriate breaks in each detection. The operation modes will be described in detail one by one.

The SPT1 mode is a mode of performing a global scan GS of the active pen 2 and position detection of the passive pointer 4 (hereinafter, referred to as touch detection T) in time division when the active pen 2 is not detected yet. The sensor controller 31 in the SPT1 mode is configured to repeatedly perform a unit of operation (UP) including, for example, two milliseconds of touch detection T and three milliseconds of global scan GS. As can be understood by comparing FIG. 3A with FIGS. 3B and 3C, the frequency of the touch detection T in the SPT1 mode is higher than that in the SPT2 mode and the revised SPT2 mode.

Figure 4A:
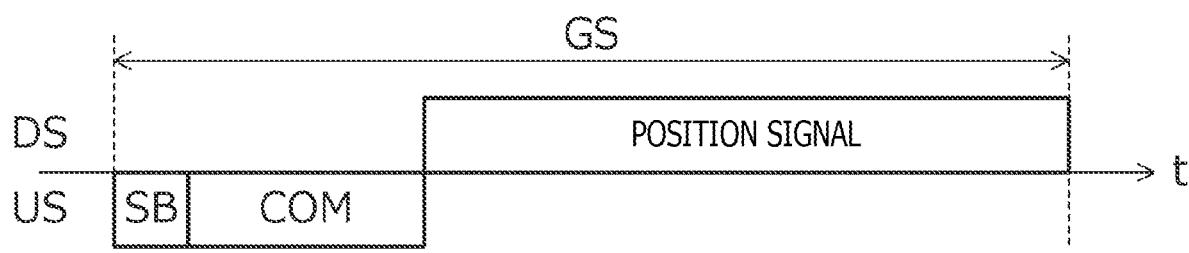
FIG. 4A depicts a configuration of an uplink signal and a downlink signal in global scan.

FIG. 4A depicts a configuration of the uplink signal US and the downlink signal DS in the global scan GS. In the global scan GS, the sensor controller 31 first transmits the uplink signal US, and then the active pen 2 that has received the uplink signal US transmits the downlink signal DS. The signals are transmitted and received in this order.

As illustrated in FIG. 4A, the uplink signal US is a signal including a predetermined start bit SB and a command COM indicating an order from the sensor controller 31 to the active pen 2. The command COM transmitted in the global scan GS includes, for example, information of communication resource to be used by the active pen 2 to transmit the downlink signal DS.

The downlink signal DS during the global scan GS includes a position signal that is a burst signal with a predetermined frequency. The global scan GS is position detection performed by the entire sensor 30, and the sensor controller 31 uses all of the plurality of sensor electrodes 30X and 30Y arranged in the touch surface 3a to receive the position signal to obtain the level of the position signal at each position in the touch surface 3a, which will be described in detail later. The sensor controller 31 is configured to detect the position of the active pen 2 on the basis of the results and to pair the tablet terminal 3 with the active pen 2.

FIGS. 3A to 3D will further be described. The SPT2 mode is a mode of performing the local scan LS of the active pen 2 and the touch detection T in time division when the paired active pen 2 is not in contact with the touch surface 3a. The sensor controller 31 in the SPT2 mode is configured to repeatedly perform a unit of operation (UP) including, for example, two milliseconds of touch detection T, three milliseconds of local scan LS, and three milliseconds of local scan LS.

Figure 4B:
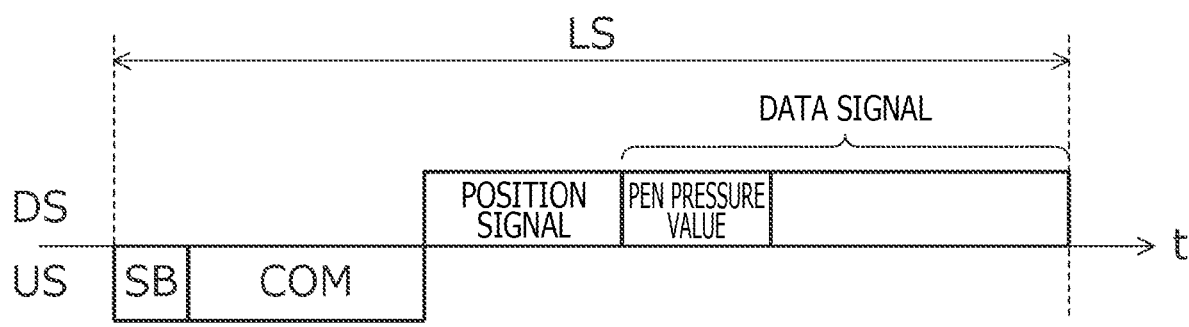
FIG. 4B depicts a configuration of the uplink signal and the downlink signal in local scan.

FIG. 4B depicts a configuration of the uplink signal US and the downlink signal DS in the local scan LS. In the local scan LS, the sensor controller 31 also transmits the uplink signal US first, and then the active pen 2 that has received the uplink signal US transmits the downlink signal DS. The signals are transmitted and received in this order. The command COM transmitted in the local scan LS includes, for example, information for specifying one of one or more paired active pens 2 and information for designating the data to be transmitted by the specified active pen 2.

The downlink signal DS during the local scan LS includes a position signal that is a burst signal with a predetermined frequency and includes a data signal including various types of data. The data signal is included, and therefore, the transmission continuation time of the position signal is shorter than that during the global scan GS. The data included in the data signal includes, for example, the pen pressure value, the switch data, and the unique ID described above. The control circuit of the active pen 2 is configured to arrange, in the data signal, the data instructed by the command COM in the uplink signal US.

The local scan LS is position detection performed by only part of the sensor 30, and the sensor controller 31 uses only a predetermined number of sensor electrodes 30X and 30Y positioned near the position detected last time among the plurality of sensor electrodes 30X and 30Y arranged in the touch surface 3a to receive the position signal to thereby obtain the level of the position signal at each position near the position detected last time. The sensor controller 31 detects the position of the active pen 2 on the basis of the results. The sensor controller 31 also decodes the received data signal to acquire the data transmitted by the active pen 2.

In the present embodiment, a relatively small number (four here) and a relatively large number (eight here) are used as the numbers of sensor electrodes 30X and 30Y used for receiving the position signal during the local scan LS. The numbers are indicated in parentheses after "LS" in FIGS. 3A to 3D.

Figure 3A:
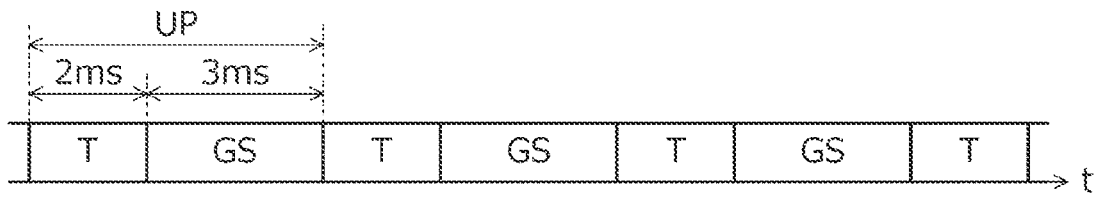
FIGS. 3A to 3D depict operation modes of a sensor controller illustrated in FIG. 2.
Figure 3B:
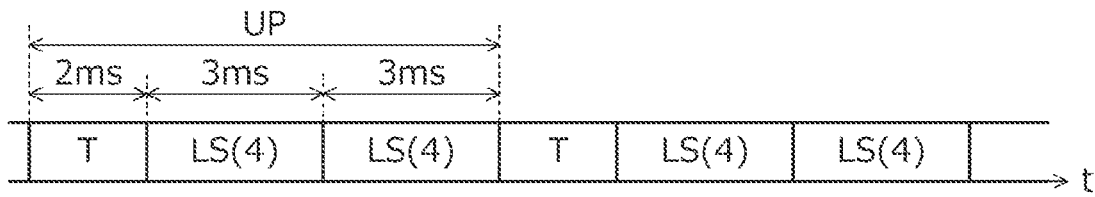

As can be understood from the description of FIG. 3B, a relatively small number of sensor electrodes 30X and 30Y are used to receive the position signal in the SPT2 mode. The reception time per sensor electrode can be relatively long when the relatively small number of sensor electrodes 30X and 30Y are used, and the signal to noise ratio can be relatively high. Therefore, the downlink signal DS can be received even if the reception level of the downlink signal DS is small, and the SPT2 mode is suitable for a case in which the active pen 2 is not in contact with the touch surface 3a (that is, a case in which the active pen 2 is hovering).

On the other hand, the position signal can be received in a wider region when a relatively large number of sensor electrodes 30X and 30Y are used as in the exclusive mode described later (see FIG. 3D), and the position of the active pen 2 can be detected with relatively high accuracy. However, only a relatively low signal to noise ratio can be obtained, and the relatively large number of sensor electrodes 30X and 30Y can be used to receive the position signal only when the active pen 2 is in contact with the touch surface 3a so that the sensor controller 31 can receive the downlink signal DS at a high level.

FIGS. 3A to 3D will further be described. The revised SPT2 mode is a mode in which the SPT2 mode is revised to allow carrying out the local scan LS at equal intervals, and the touch detection T for one panel surface is divided into two parts. Specifically, it is only required that the touch surface 3a can be divided into halves, and the touch detection T can alternately be carried out. The sensor controller 31 in the revised SPT2 mode is configured to repeatedly perform a unit of operation (UP) including, for example, one millisecond of touch detection T/2 (½ of touch detection T) and three milliseconds of local scan LS(4).

The exclusive mode is a mode of performing only the local scan LS of the active pen 2 without performing the touch detection T when the detected active pen 2 is in contact with the touch surface 3a. The sensor controller 31 in the exclusive mode is configured to repeatedly perform a unit of operation (UP) including, for example, only three milliseconds of local scan LS. A relatively large number (specifically, eight) of sensor electrodes 30X and 30Y are used to receive the position signal in the exclusive mode as described above. The reason is as described above.

The configurations of the sensor 30, the sensor controller 31, and the host processor 32 will be described in detail with reference again to FIG. 2.

The sensor 30 includes a plurality of sensor electrodes 30X and a plurality of sensor electrodes 30Y arranged in a matrix, the plurality of sensor electrodes 30X extending in a Y direction and arranged at equal intervals in an X direction orthogonal to the Y direction, the plurality of sensor electrodes 30Y extending in the X direction and arranged at equal intervals in the Y direction. Although the sensor electrodes 30X and 30Y both include linear conductors in the example illustrated here, the sensor electrodes 30X and 30Y may also include conductors in other shapes. For example, one of the sensor electrodes 30X and 30Y may include a plurality of rectangular conductors two-dimensionally arranged to allow detecting two-dimensional coordinates of the active pen 2.

The sensor controller 31 includes an MCU 40, a logic circuit 41, transmitters 42 and 43, a receiver 44, and a selection circuit 45, as illustrated in FIG. 2. In one or more embodiments, the MCU 40 includes a processor and a memory storing instructions that, when executed by the processor, cause the sensor controller 31 to perform the operations described herein.

The MCU 40 and the logic circuit 41 are control circuits that control the transmitters 42 and 43, the receiver 44, and the selection circuit 45 to control the transmission and reception operation of the sensor controller 31. Specifically, the MCU 40 is a microprocessor including memories (a read only memory (ROM) and a random access memory (RAM)) inside and configured to execute programs stored in the memories to operate. The operation timing of the MCU 40 is controlled by a timing signal supplied from the host processor 32. Other than the control operation of the logic circuit 41, the operations performed by the MCU 40 include an operation of supplying a pixel drive voltage Vcom to the selection circuit 45, an operation of controlling the transmitter 42 to output finger detection signals FDS, an operation of supplying, to the transmitter 43, the command COM indicating the details of the instruction for the active pen 2, an operation of detecting the positions of the active pen 2 and the passive pointer 4 (specifically, coordinates x and y indicating the positions in the touch surface 3a) on the basis of a digital signal supplied from the receiver 44, an operation of decoding the digital signal supplied from the receiver 44 to acquire data Res (for example, the pen pressure value, the switch data, or the unique ID described above) transmitted by the active pen 2, an operation of determining the contact state of the active pen 2 with respect to the touch surface 3a on the basis of the pen pressure value included in the data Res, and an operation of entering one of the operation modes illustrated in FIGS. 3A to 3D according to the result of the determination or the like. The logic circuit 41 has a function of outputting control signals ctrl_t1 to ctrl_t4 and ctrl_r on the basis of the control of the MCU 40.

The transmitter 42 is a circuit that generates the finger detection signals FDS according to the control of the MCU 40 and that supplies the finger detection signals FDS to the sensor electrodes 30X through the selection circuit 45.

Figure 5:
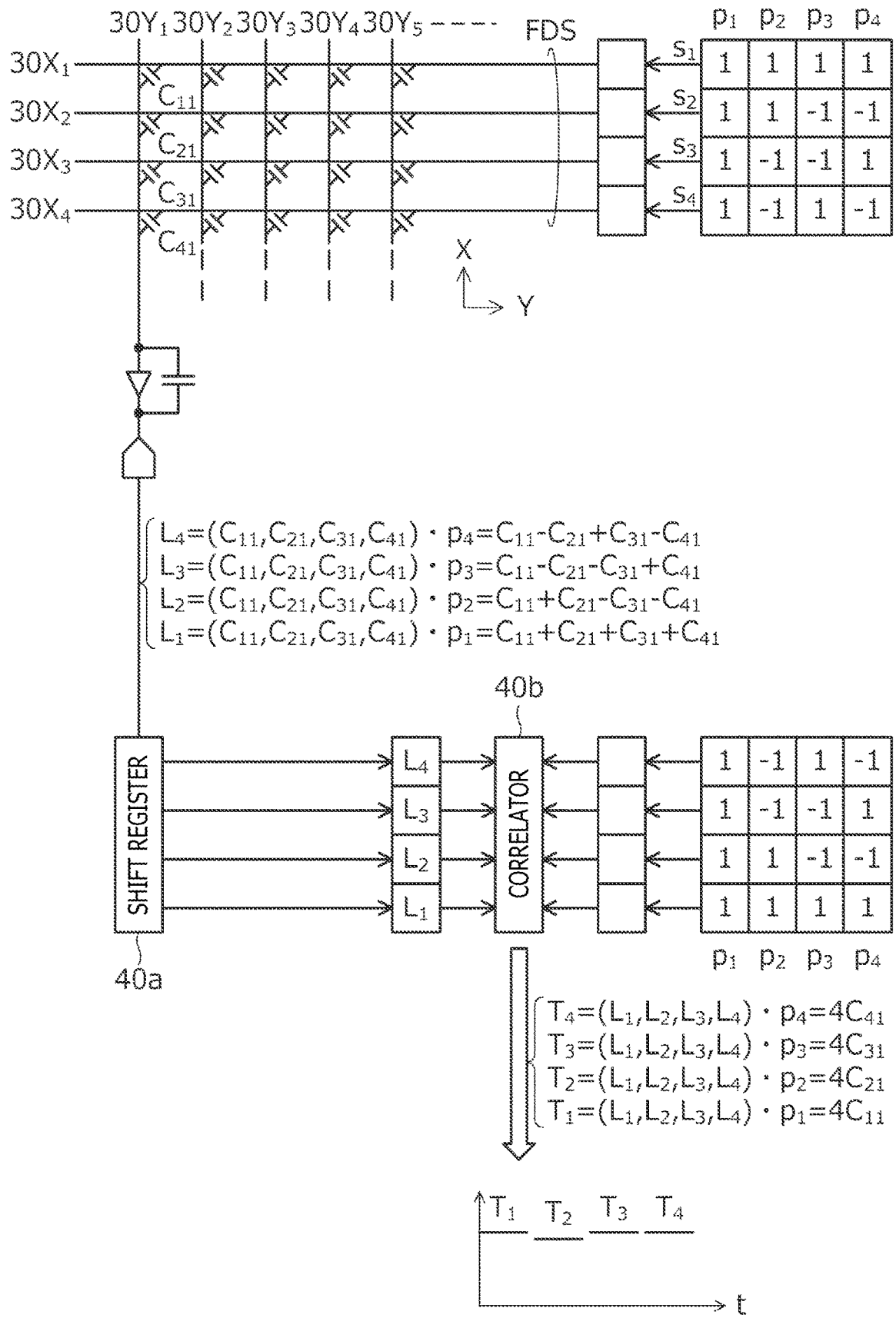
FIG. 5 depicts a principle of a position detection process of a passive pointer performed by a microprocessor unit (MCU) illustrated in FIG. 2.

FIG. 5 depicts a principle of the position detection process of the passive pointer 4 perform by the MCU 40. Although only four sensor electrodes 30X are illustrated in FIG. 5 for the simplification, more sensor electrodes 30X are actually arranged. In the following description, it is assumed that the number of sensor electrodes 30X is K.

As illustrated on the upper right of FIG. 5, the finger detection signals FDS include, for example, K signals $s_1$ to $s_K$ each including K pulses indicated by "1" or "−1." In each of the signals $s_1$ to $s_K$, nth (n=1 to K) pulses provide a pulse group $p_n$, and the pulses included in one pulse group pn are input parallel from the transmitter 42 illustrated in FIG. 2 to each sensor electrode 30X through the selection circuit 45.

FIG. 2 will further be described. The transmitter 43 is a circuit that generates the uplink signal US according to the control of the MCU 40 and the logic circuit 41 and that supplies the uplink signal US to the selection circuit 45. As illustrated in FIG. 2, the transmitter 43 includes a pattern supply circuit 50, a switch 51, a code sequence holding circuit 52, a spread processing circuit 53, and a transmission guard circuit 54. Although the pattern supply circuit 50 among them is particularly included in the transmitter 43 in the description of the present embodiment, the pattern supply circuit 50 may be included in the MCU 40.

The pattern supply circuit 50 holds the start bit SB arranged at the top of the uplink signal US and outputs the held start bit SB according to the instruction of the control signal ctrl_t1 supplied from the logic circuit 41.

The switch 51 has a function of selecting one of the pattern supply circuit 50 and the MCU 40 on the basis of the control signal ctrl_t2 supplied from the logic circuit 41 and supplying the output of the selected one to the spread processing circuit 53. The start bit SB is supplied to the spread processing circuit 53 when the switch 51 selects the pattern supply circuit 50. On the other hand, the command COM is supplied to the spread processing circuit 53 when the switch 51 selects the MCU 40.

The code sequence holding circuit 52 has a function of generating a spread code of a predetermined chip length with autocorrelation characteristics on the basis of the control signal ctrl_t3 supplied from the logic circuit 41 and holding the spread code. The spread code held by the code sequence holding circuit 52 is supplied to the spread processing circuit 53.

The spread processing circuit 53 has a function of modulating the spread code held by the code sequence holding circuit 52 on the basis of the value (start bit SB or command COM) supplied through the switch 51 to acquire the transmission chip sequence of a predetermined chip length. The spread processing circuit 53 supplies the acquired transmission chip sequence to the selection circuit 45 through the transmission guard circuit 54.

The transmission guard circuit 54 has a function of inserting a guard period (period without transmission and reception) necessary for switching the transmission operation and the reception operation between the transmission period of the uplink signal US and the reception period of the downlink signal DS on the basis of the control signal ctrl_t4 supplied from the logic circuit 41.

The selection circuit 45 includes switches 58x and 58y and conductor selection circuits 59x and 59y.

The switch 58y is a switch element in which a common terminal and any one of a T terminal and an R terminal are connected. The common terminal of the switch 58y is connected to the conductor selection circuit 59y, the T terminal is connected to an output end of the transmitter 43, and the R terminal is connected to an input end of the receiver 44. The switch 58x is a switch element in which a common terminal and one of a T1 terminal, a T2 terminal, a D terminal, and an R terminal are connected. Of these, the T2 terminal is actually a set of terminals corresponding to the number of sensor electrodes 30X. The common terminal of the switch 58x is connected to the conductor selection circuit 59x, the T1 terminal is connected to the output end of the transmitter 43, the T2 terminal is connected to an output end of the transmitter 42, the D terminal is connected to an output end of the MCU 40 that outputs the pixel drive voltage Vcom, and the R terminal is connected to the input end of the receiver 44.

The conductor selection circuit 59x is a switch element that selectively connects the plurality of sensor electrodes 30X to the common terminal of the switch 58x. The conductor selection circuit 59x can connect part or all of the plurality of sensor electrodes 30X at the same time to the common terminal of the switch 58x. When the T2 terminal and the common terminal are connected in the switch 58x, the conductor selection circuit 59x connects, one to one, a plurality of terminals included in the T2 terminal and the plurality of sensor electrodes 30X.

The conductor selection circuit 59y is a switch element that selectively connects the plurality of sensor electrodes 30Y to the common terminal of the switch 58y. The conductor selection circuit 59y can also connect part or all of the plurality of sensor electrodes 30Y at the same time to the common terminal of the switch 58y.

Four control signals sTRx, sTRy, selX, and selY are supplied from the logic circuit 41 to the selection circuit 45. Specifically, the control signal sTRx is supplied to the switch 58x, the control signal sTRy is supplied to the switch 58y, the control signal selX is supplied to the conductor selection circuit 59x, and the control signal selY is supplied to the conductor selection circuit 59y. The logic circuit 41 uses the control signals sTRx, sTRy, selX, and selY to control the selection circuit 45 to realize the transmission of the uplink signal US or the finger detection signal FDS, the application of the pixel drive voltage Vcom, and the reception of the downlink signal DS or the finger detection signal FDS.

Specifically, at the timing of transmitting the uplink signal US, the logic circuit 41 controls the selection circuit 45 to connect all of the plurality of sensor electrodes 30Y at the same time to the transmitter 43. In this way, the uplink signal US is transmitted at the same time from all of the plurality of sensor electrodes 30Y, and the active pen 2 can receive the uplink signal US anywhere on the touch surface 3a.

At the timing of receiving the position signal in the downlink signal DS, the logic circuit 41 performs different processes for the global scan GS and the local scan LS described above. Specifically, in the case of performing the global scan GS, the logic circuit 41 sequentially selects all of the sensor electrodes 30X and 30Y one by one and controls the selection circuit 45 to connect the selected sensor electrodes 30X and 30Y to the receiver 44. As a result, the number of position signals sequentially supplied to the receiver 44 is equal to the number of sensor electrodes 30X and 30Y. In the case of performing the local scan LS, the MCU 40 selects the number (four or eight) of sensor electrodes 30X and 30Y corresponding to the entered operation mode from the sensor electrodes 30X and 30Y in the neighborhood region of the position detected last time. The logic circuit 41 sequentially selects, one by one, the predetermined number of selected sensor electrodes 30X and 30Y at time intervals corresponding to the number of selected sensor electrodes 30X and 30Y and controls the selection circuit 45 to connect the selected sensor electrodes 30X and 30Y to the receiver 44. As a result, the number of position signals sequentially supplied to the receiver 44 is equal to the number of selected sensor electrodes 30X and 30Y.

The MCU 40 is configured to detect the position of the active pen 2 on the basis of the levels of the position signals supplied to the receiver 44. Specifically, the MCU 40 determines the level of the position signal at each intersection of the plurality of sensor electrodes 30X and 30Y on the basis of the digital signal (described later) supplied from the receiver 44. The MCU 40 detects the position of the active pen 2 on the basis of the determined levels. Specifically, the MCU 40 may determine a region in the touch surface 3a in which the levels of the position signals are equal to or greater than a predetermined value, and the MCU 40 may detect, for example, the center position of the region as the position of the active pen 2.

At the timing of receiving the data signal in the downlink signal DS, the MCU 40 selects one of the plurality of sensor electrodes 30X and 30Y closest to the position of the active pen 2 detected on the basis of the most recent position signal. The logic circuit 41 controls the selection circuit 45 to connect the selected sensor electrode 30X or 30Y to the receiver 44. As a result, the data signal transmitted by the active pen 2 is supplied to the receiver 44.

At the timing of transmitting the finger detection signal FDS, the logic circuit 41, along with the MCU 40, selects one sensor electrode 30Y and causes the transmitter 42 to sequentially input pulse groups $p_1$ to $p_K$ illustrated in FIG. 5 to each sensor electrode 30X, and the logic circuit 41 repeats the operation for each sensor electrode 30Y. Specifically, the logic circuit 41 first controls the selection circuit 45 to connect, one to one, the plurality of terminals included in the T2 terminal of the switch 58x and the plurality of sensor electrodes 30X. While maintaining this state, the logic circuit 41 controls the selection circuit 45 to sequentially select the plurality of sensor electrodes 30Y one by one and connect the selected sensor electrodes 30Y to the receiver 44.

While one sensor electrode 30Y is selected, the MCU 40 further sequentially reads the pulse groups $p_1$ to $p_K$ one by one from the memory, and every time the pulse group is read, the MCU 40 supplies K pulses included in the read pulse group to the transmitter 42. The transmitter 42 inputs parallel the supplied K pulses to K sensor electrodes 30X. As a result of the control, the levels of the digital signals supplied from the receiver 44 reflect the change in the capacitance formed at intersections of the selected sensor electrode 30Y and the sensor electrodes 30X. Therefore, the MCU 40 is configured to detect the position of the passive pointer 4 on the basis of the levels of the digital signals supplied from the receiver 44.

The position detection process of the passive pointer 4 performed by the MCU 40 will be described in more detail with reference again to FIG. 5. Although the number of sensor electrodes 30X is four (that is, K=4) in the following description, the description similarly applies to a case in which the number of sensor electrodes 30X is equal to or smaller than 3 or equal to or greater than 5.

When the number of sensor electrodes 30X is four, each of signals $s_1$ to $s_K$ includes four pulses indicated by "1" or "−1." Specifically, the signal $s_1$ includes "1, 1, 1, 1," the signal $s_2$ includes "1, 1, −1, −1," the signal $s_3$ includes "1, −1, −1, 1," and the signal S4 includes "1, −1, 1, −1" as illustrated in FIG. 5.

The MCU 40 has functions including a shift register 40a and a correlator 40b. The shift register 40a is a storage device in a FIFO format, and the shift register 40a can store the same number (that is, K) of data as the number of sensor electrodes 30X. The data stored K times before is deleted when data is newly stored in the shift register 40a. As described above, the MCU 40 and the logic circuit 41 select one sensor electrode 30Y and cause the transmitter 42 to sequentially input the pulse groups $p_1$ to $p_4$ to each sensor electrode 30X. The MCU 40 and the logic circuit 41 repeat the operation for each sensor electrode 30Y. As a result, four levels $L_1$ to $L_4$ respectively corresponding to the pulse groups $p_1$ to $p_4$ sequentially appear at the selected sensor electrode 30Y. The MCU 40 sequentially acquires the levels $L_1$ to $L_4$ appearing at the sensor electrode 30Y through the receiver 44 and stores the levels $L_1$ to $L_4$ in the shift register 40a each time the level is acquired.

An example of a case in which the sensor electrode $30Y_1$ illustrated in FIG. 5 is selected will be illustrated to specifically describe the levels $L_1$ to $L_4$ in detail. In the following description, the capacitance formed between the sensor electrode $30Y_1$ and four sensor electrodes $30X_1$ to $30X_4$ will be referred to as $C_{11}$ to $C_{41}$.

The level $L_1$ corresponding to the pulse group $p_1$ and stored in the shift register 40a is an inner product of a vector $(C_{11}, C_{21}, C_{31}, C_{41})$ of the capacitance and a vector (1, 1, 1, 1) indicating the pulse group $p_1$. The inner product is calculated as $C_{11}+C_{21}+C_{31}+C_{41}$ as also illustrated in FIGS. 3A to 3D. Similarly, the level $L_2$ corresponding to the pulse group $p_2$ and stored in the shift register 40a is an inner product of the vector $(C_{11}, C_{21}, C_{31}, C_{41})$ of the capacitance and a vector (1, 1, −1, −1) indicating the pulse group $p_2$, and the inner product is calculated as $C_{11}+C_{21}-C_{31}-C_{41}$. The level $L_3$ corresponding to the pulse group $p_3$ and stored in the shift register 40a is an inner product of the vector $(C_{11}, C_{21}, C_{31}, C_{41})$ of the capacitance and a vector (1, −1, −1, 1) indicating the pulse group $p_3$, and the inner product is calculated as $C_{11}-C_{21}-C_{31}+C_{41}$. The level $L_4$ corresponding to the pulse group $p_4$ and stored in the shift register 40a is an inner product of the vector $(C_{11}, C_{21}, C_{31}, C_{41})$ of the capacitance and a vector (1, −1, 1, −1) indicating the pulse group $p_4$, and the inner product is calculated as $C_{11}-C_{21}+C_{31}-C_{41}$.

The MCU 40 uses the correlator 40b to sequentially calculate correlation values $T_1$ to $T_4$ between the four pulse groups $p_1$ to $p_4$ and the levels $L_1$ to $L_4$ stored in the shift register 40a. Specifically, the calculated correlation values $T_1$ to $T_4$ are $4C_{11}$, $4C_{21}$, $4C_{31}$, and $4C_{41}$, respectively, as also illustrated in FIG. 5. That is, the change in the capacitance formed at the intersections of the sensor electrodes $30X_1$ to $30X_4$ and the sensor electrode $30Y_1$ is reflected on the correlation values $T_1$ to $T_4$. Therefore, the MCU 40 can refer to the correlation values $T_1$ to $T_4$ calculated for each sensor electrode 30Y to detect the position of the passive pointer 4. Specifically, it is sufficient if the MCU 40 may determine the region in the touch surface 3a in which the change in the capacitance is equal to or greater than a predetermined value, and the MCU 40 may detect, for example, the center position of the region as the position of the passive pointer 4. Note that when there are a plurality of separate regions in the touch surface 3a in which the change in the capacitance is equal to or greater than the predetermined value, it is sufficient if the MCU 40 may detect each region as a position of the passive pointer 4.

FIG. 2 will further be described. The logic circuit 41 controls the switch 58x to connect the D terminal to the common terminal at the timing of applying the pixel drive voltage Vcom. As a result, the pixel drive voltage Vcom is supplied to each of the plurality of sensor electrodes 30X, and the pixel drive operation can be perform performed.

The receiver 44 is a circuit that receives the downlink signal DS transmitted by the active pen 2 or the finger detection signal FDS transmitted by the transmitter 42 on the basis of the control signal ctrl_r of the logic circuit 41. Specifically, the receiver 44 includes an amplification circuit 55, a detection circuit 56, and an analog to digital (AD) converter 57.

The amplification circuit 55 amplifies and outputs the downlink signal DS or the finger detection signal FDS supplied from the selection circuit 45. The detection circuit 56 is a circuit that generates a voltage corresponding to the level of the output signal of the amplification circuit 55. The AD converter 57 is a circuit that samples, at predetermined time intervals, the voltage output from the detection circuit 56 to generate a digital signal. The digital signal output by the AD converter 57 is supplied to the MCU 40.

The MCU 40 detects the positions (coordinates x and y) of the passive pointer 4 and the active pen 2 and acquires the data Res transmitted by the active pen 2 on the basis of the digital signal supplied in this way. Specifically, for the position of the passive pointer 4, the MCU 40 acquires the levels $L_1$ to $L_K$ respectively corresponding to the pulse groups $p_1$ to $p_K$ for each of the sensor electrodes 30Y on the basis of the supplied digital signal. The method of detecting the position of the passive pointer 4 from the levels $L_1$ to $L_K$ is as described above with reference to FIG. 5. Next, for the position of the active pen 2, the MCU 40 determines the levels of the position signals at the intersections of the plurality of sensor electrodes 30X and 30Y on the basis of the supplied digital signal and detects the position of the active pen 2 on the basis of the determined levels as described above. Lastly, for the data Res, the MCU 40 decodes the digital signal supplied from the receiver 44 to acquire the data Res. The MCU 40 is configured to output the detected positions (coordinates x and y) and the data Res to the host processor 32.

The MCU 40 is also configured to determine the contact state of the active pen 2 with respect to the touch surface 3a on the basis of the pen pressure value included in the acquired data Res. When the MCU 40 determines that the active pen 2 has newly come into contact with the touch surface 3a (that is, when the pen pressure value has changed from 0 to a positive value), the MCU 40 outputs pen-down information IN-PROXY to the host processor 32. When the MCU 40 determines that the active pen 2 is separated from the touch surface 3a (that is, when the pen pressure has changed from a positive value to 0), the MCU 40 outputs pen-up information OUT-PROXY to the host processor 32. The pen-down information IN-PROXY and the pen-up information OUT-PROXY output in this way are used by the host processor 32 to recognize the start and the end of a stroke.

The MCU 40 further selects one of the SPT1 mode, the SPT2 mode (or the revised SPT2 mode), and the exclusive mode and enters the selected operation mode according to whether or not the downlink signal DS is received and according to whether or not the pen pressure value included in the acquired data Res indicates that the pen tip is in contact with the touch surface. The MCU 40 controls the logic circuit 41 and the like according to the entered operation mode. Processes performed by the MCU 40 in relation to this will be described in detail with reference to flow charts illustrated in FIGS. 6 to 10.

Figure 6:
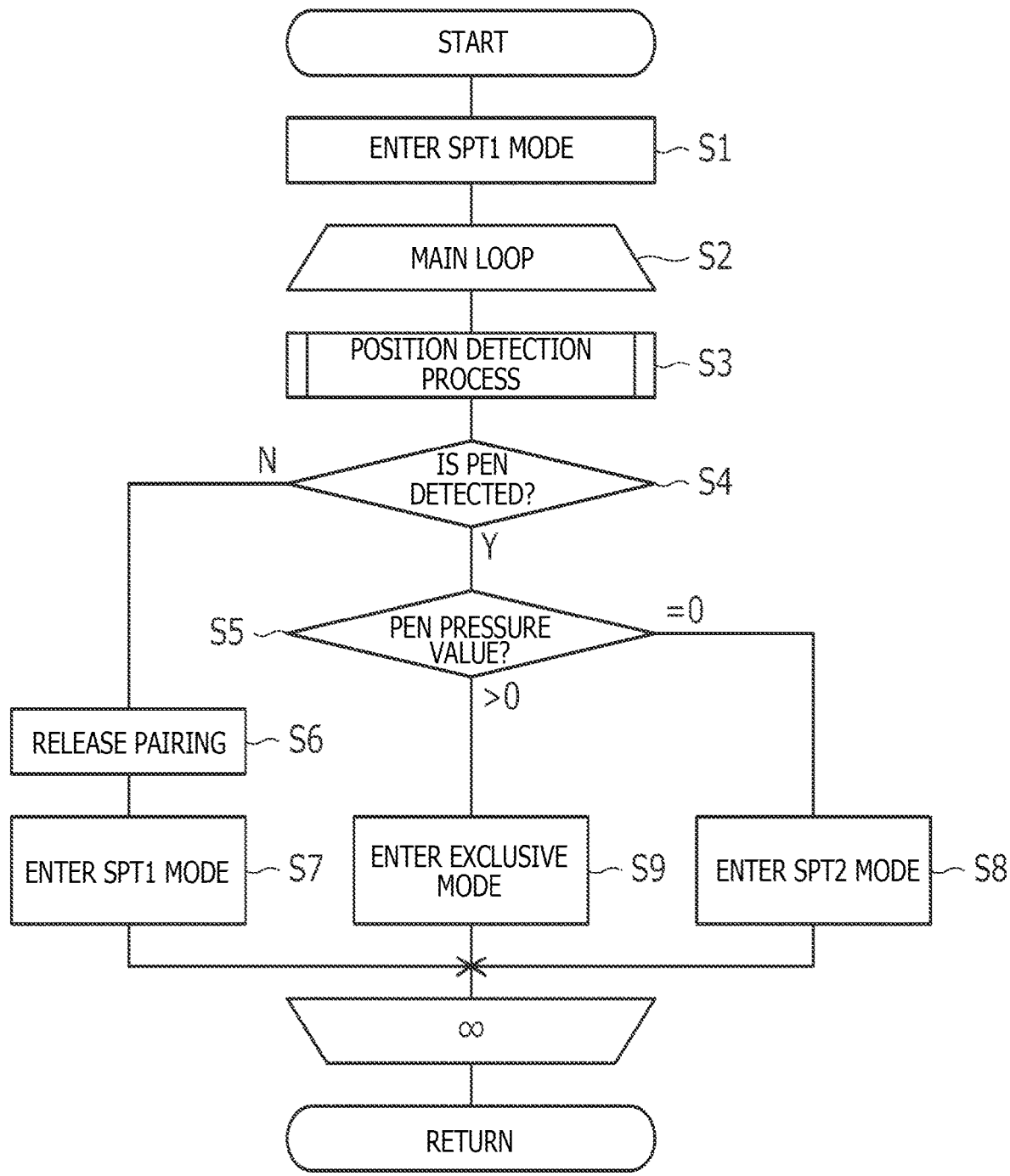
FIG. 6 is a flow chart illustrating a part related to detection of an active pen and the passive pointer in a process performed by the MCU illustrated in FIG. 2.

FIG. 6 is a flow chart illustrating the part related to the detection of the active pen 2 and the passive pointer 4 in the processes performed by the MCU 40. As illustrated in FIG. 6, the MCU 40 first enters the SPT1 mode (S1). The MCU 40 then repeatedly performs processes S3 to S9 (S2).

The MCU 40 that has started the processes S3 to S9 first performs a position detection process (S3). The details of the position detection process vary according to the operation mode entered by the MCU 40. The details of the position detection process in each operation mode will be described later with reference to FIGS. 7 to 10. The MCU perform S4 to S9 according to the results of the position detection process (specifically, whether or not the active pen 2 is detected and the pen pressure value received from the active pen 2) to perform a process of controlling the operation mode of the sensor controller 31 (control act).

Specifically, the MCU 40 first determines whether the active pen 2 is detected in the position detection process (S4, determination act). The determination can be made according to whether or not the downlink signal DS is detected in the position detection process. That is, the MCU 40 can determine that the active pen 2 is detected if the downlink signal DS is detected even once, and the MCU 40 can determine that the active pen 2 is not detected if the downlink signal DS is never detected.

The MCU 40 that has determined that the active pen 2 is "not detected" at S4 releases the pairing if the tablet terminal 3 is already paired with the active pen 2 at S17 described later (see FIG. 7) (S6). The MCU 40 enters the SPT1 mode (S7) and returns to S3. Therefore, the global scan GS of the active pen 2 and the position detection of the passive pointer 4 will be performed in time division in the next position detection process.

The MCU 40 that has determined that the active pen 2 is "detected" at S4 determines whether the pen pressure value received from the active pen 2 is equal to 0 or larger than 0 (S5). Note that the pen tip of the active pen 2 is not in contact with the touch surface 3a when the pen pressure value is equal to 0, and the pen tip of the active pen 2 is in contact with the touch surface 3a when the pen pressure value is larger than 0.

Figure 3C:
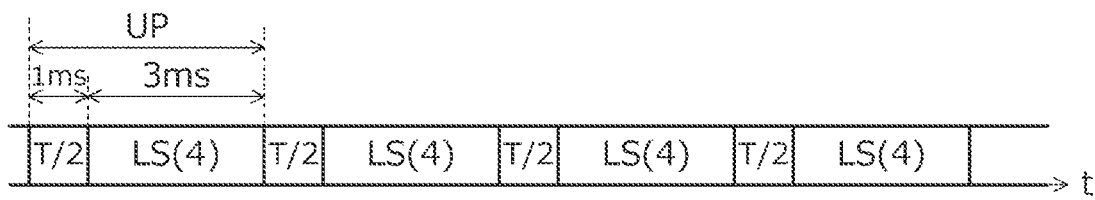

The MCU 40 that has determined that the "pen pressure value is equal to 0" at S5 enters the SPT2 mode (or the revised SPT2 mode) (S8) and returns to S3. Therefore, the local scan LS of the active pen 2 and the position detection of the passive pointer 4 will be performed in time division in the next position detection process. As illustrated in FIGS. 3B and 3C, four sensor electrodes 30X and 30Y are used to receive the position signal in this case, and a relatively high signal to noise ratio can be obtained.

Figure 3D:
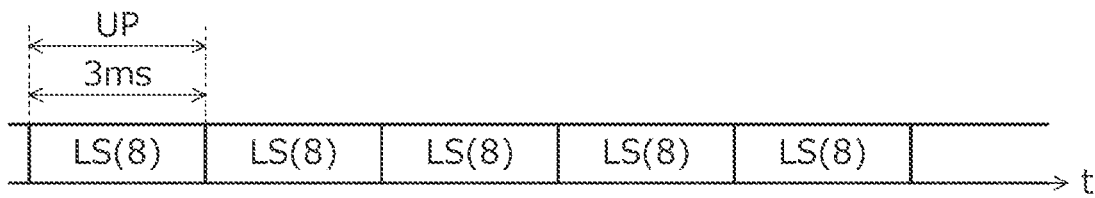

On the other hand, the MCU 40 that has determined that the "pen pressure value is larger than 0" in S5 enters the exclusive mode (S9) and returns to S3. Therefore, the position detection of the passive pointer 4 will not be performed in the next position detection process, and only the local scan LS of the active pen 2 will be performed. This can set a relatively high detection rate (detection frequency) of the position of the active pen 2. As illustrated in FIG. 3D, eight sensor electrodes 30X and 30Y are used in this case to receive the position signal, and the position of the active pen 2 can be detected at relatively high accuracy.

The position detection process in each operation mode will be described in detail with reference to FIGS. 7 to 10.

Figure 7:
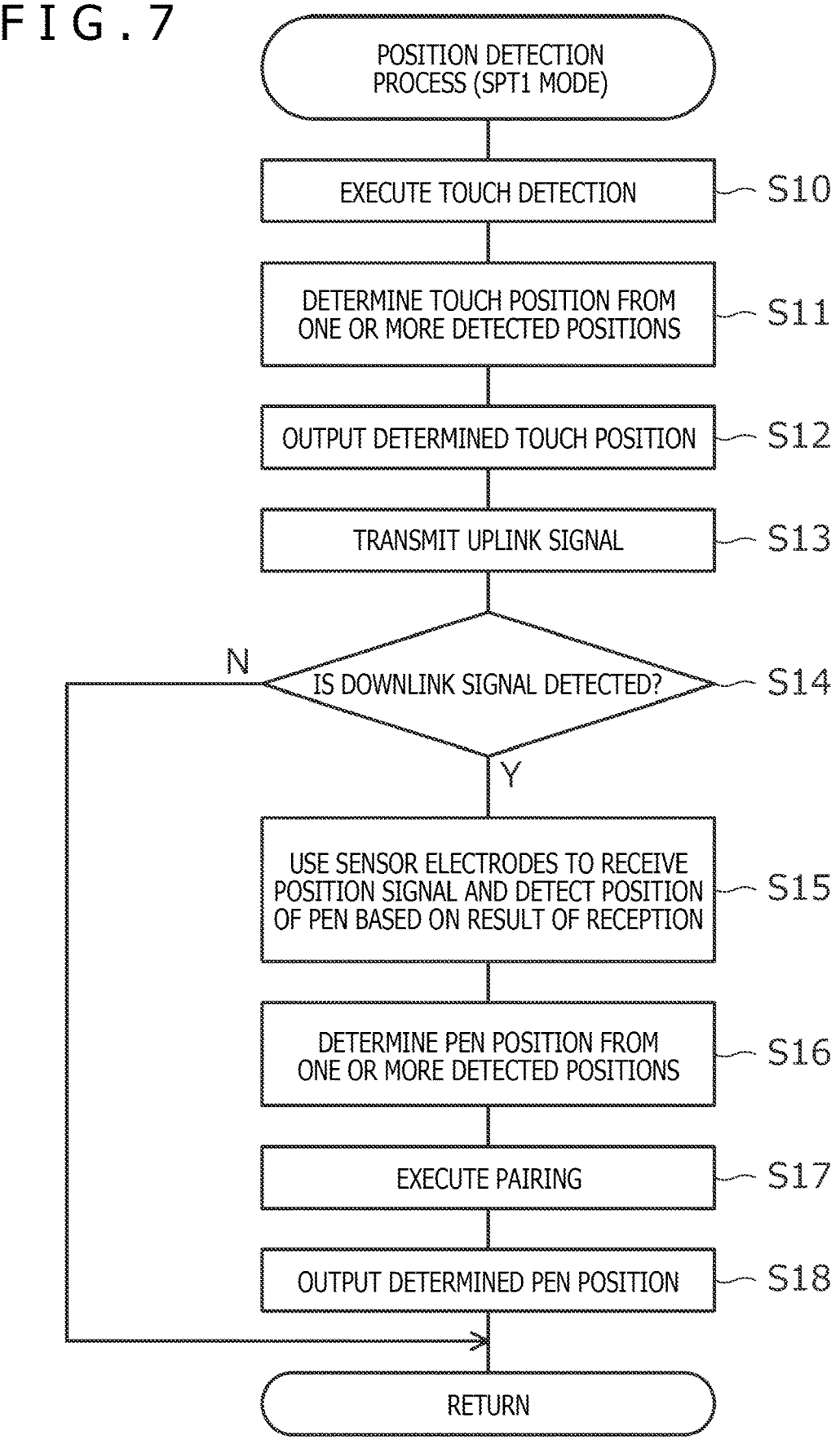
FIG. 7 depicts a process flow of the position detection process in an SPT1 mode.

FIG. 7 depicts a process flow of the position detection process in the SPT1 mode. As illustrated in FIG. 7, the MCU 40 first performs the touch detection (position detection of the passive pointer 4, the same applies hereinafter) to detect the position of the passive pointer 4 (S10).

The position of the active pen 2 is detected as the position of the passive pointer 4 at S10 in some cases due to the capacitive coupling between the pen electrode provided on the front end of the active pen 2 and the sensor electrodes 30X and 30Y. In addition, a position not intended by the user is detected as the position of the passive pointer 4 in some cases, such as when the user places the hand on the touch surface 3a.

Therefore, instead of automatically setting all of the one or more positions detected at S10 as touch positions, the MCU 40 determines one or more touch positions from one or more positions detected at S10 on the basis of the result of the most recently performed position detection of the active pen 2 and the area of the region in the touch surface 3a in which the change in the capacitance described above is equal to or greater than the predetermined value (S11). This prevents the false detection. The MCU 40 then outputs the coordinates (x, y) of the determined touch positions to the host processor 32 illustrated in FIG. 2 (S12).

The MCU 40 transmits the uplink signal US (S13) and determines whether or not the downlink signal DS is detected in response to the transmission (S14). The position detection process ends if the downlink signal DS is not detected. On the other hand, if the downlink signal DS is detected, the MCU 40 uses the sensor electrodes 30X and 30Y to receive the position signal transmitted by the active pen 2 and detects the position of the pen on the basis of the result of the reception (S15).

Here, the downlink signal DS transmitted by the active pen 2 is also transmitted from the hand holding the active pen 2 in some cases, and as a result, the position of the hand holding the active pen 2 is detected as the position of the active pen 2 at S15. There is also a case in which the current from the pen electrode provided on the front end of the active pen 2 enters the arm on the opposite side of the hand holding the active pen 2 through the sensor electrodes 30X and 30Y, and the current returns to the active pen 2 through the human body. As a result of the formation of the current path, the downlink signal DS is detected below the arm, and a position not touched by the active pen 2 or the passive pointer 4 is detected as the position of the active pen 2 (ghost position).

Therefore, instead of automatically setting all of the one or more positions detected at S15 as pen positions, the MCU 40 determines one or more pen positions from one or more positions detected at S15 on the basis of the result of the most recently performed position detection of the passive pointer 4 (S16). This prevents the false detection described above. The MCU 40 then pairs the tablet terminal 3 with the active pen 2 that has transmitted the position signal (S17) and outputs the coordinates (x, y) indicating the determined pen position to the host processor 32 illustrated in FIG. 2 (S18). The MCU 40 ends the position detection process.

Figure 8:
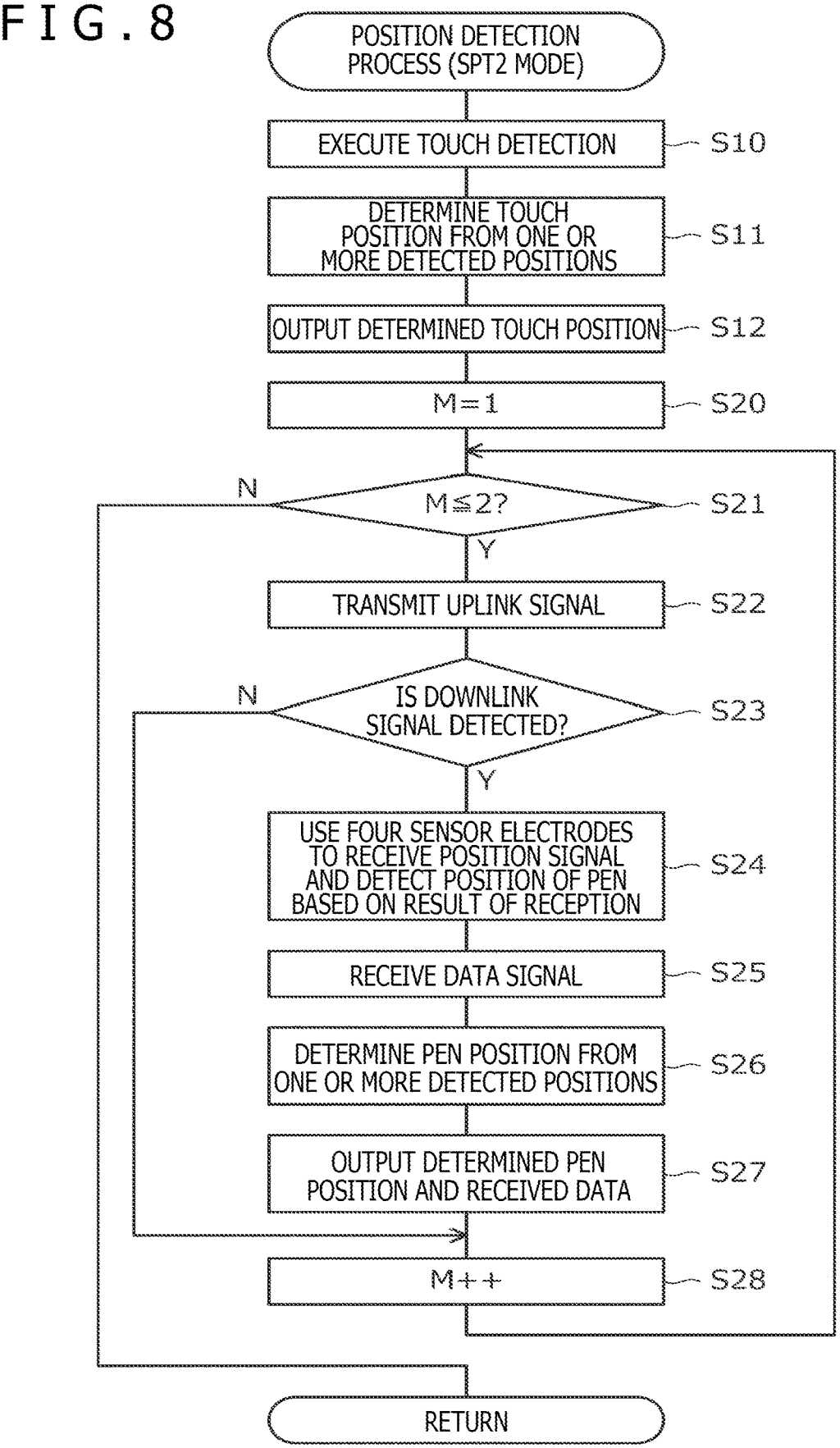
FIG. 8 depicts a process flow of the position detection process in an SPT2 mode.

FIG. 8 depicts a process flow of the position detection process in the SPT2 mode. As illustrated in FIG. 8, the MCU 40 first performs S10 to S12 to output the coordinates (x, y) indicating the touch position to the host processor 32 illustrated in FIG. 2.

The MCU 40 then puts 1 into a variable M (S20) and determines whether the variable M is equal to or smaller than 2 (S21). If the variable M is equal to or smaller than 2, the MCU 40 transmits the uplink signal US (S22) and determines whether or not the downlink signal DS is detected in response to the transmission (S23). If the variable M is not equal to or smaller than 2, the MCU 40 ends the position detection process.

If the MCU 40 determines that the downlink signal DS is not detected at S23, the MCU 40 adds 1 to the variable M and returns to S21. On the other hand, if the MCU 40 determines that the downlink signal DS is detected, the MCU 40 selects four sensor electrodes 30X and 30Y on the basis of the pen position of the last time, uses the selected sensor electrodes 30X and 30Y to receive the position signal transmitted by the active pen 2, and detects the position of the pen on the basis of the result of the reception (S24). The MCU 40 then selects one sensor electrode 30X or 30Y on the basis of the pen position of the last time and uses the selected sensor electrode 30X or 30Y to receive the data signal transmitted by the active pen 2 (S25). As a result of the reception of the data signal, the MCU 40 acquires the data, such as pen pressure value, transmitted by the active pen 2 (acquisition act).

The MCU 40 determines one or more pen positions from the one or more positions detected at S24 on the basis of the result of the most recently performed position detection of the passive pointer 4 as in S16 illustrated in FIG. 7 (S26). The MCU 40 outputs the coordinates (x, y) indicating the determined pen position to the host processor 32 illustrated in FIG. 2 along with the data included in the received data signal (S27). The MCU 40 then adds 1 to the variable M and returns to S21.

Figure 9:
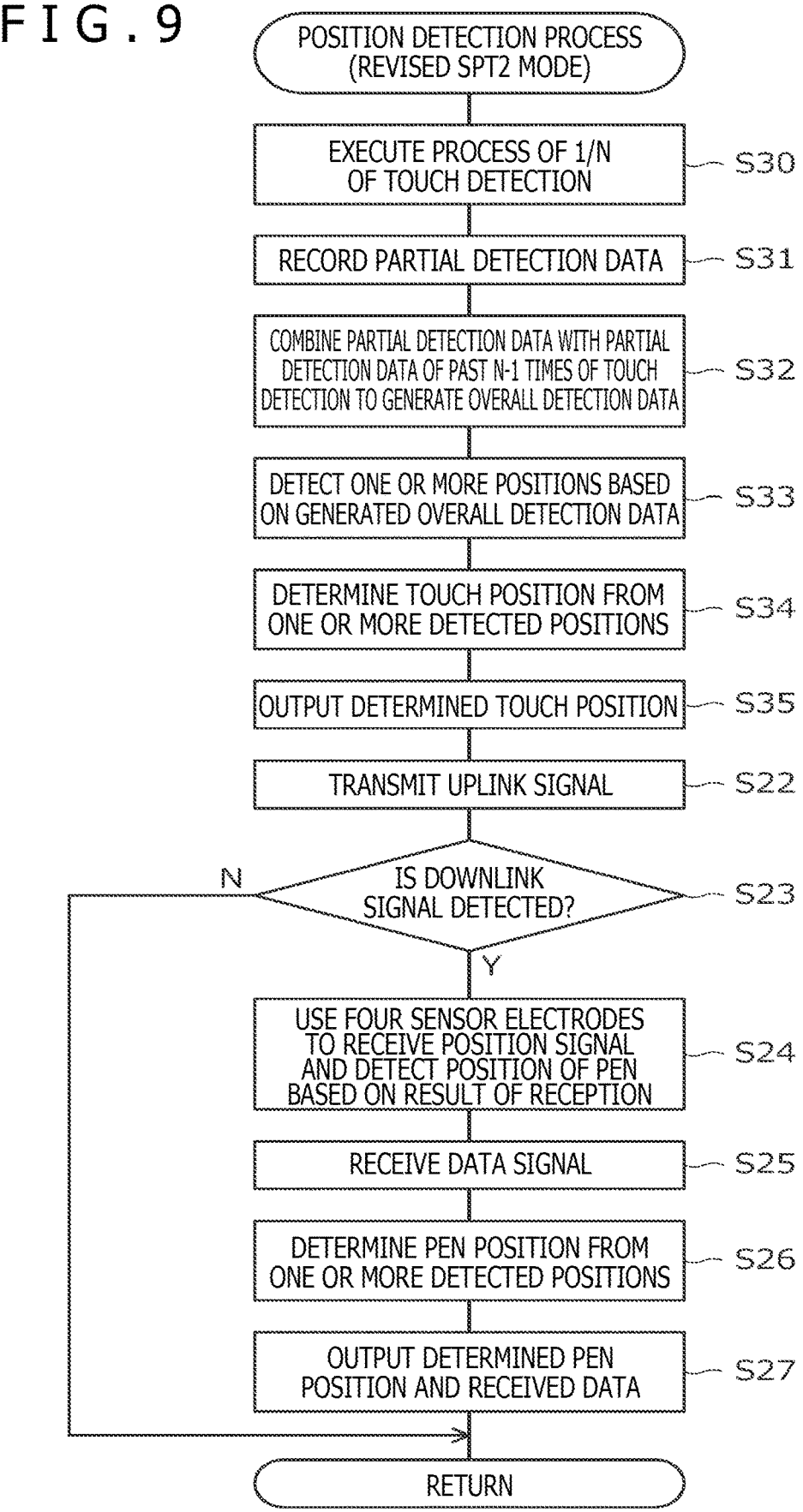
FIG. 9 depicts a process flow of the position detection process in a revised SPT2 mode.

FIG. 9 depicts a process flow of the position detection process in the revised SPT2 mode. As illustrated in FIG. 9, the MCU 40 first performs a process of 1/N of the touch detection (S30). The process of 1/N of the touch detection is a process of one part of touch detection when the touch detection for one panel surface is divided into N parts. For example, the touch surface 3a may be divided into N regions, and the touch detection may be sequentially carried out for the N regions.

The MCU 40 that has performed the process of 1/N of the touch detection records partial detection data indicating the result of the process in the memory not illustrated (S31) and further combines the partial detection data with partial detection data of past N−1 times of the touch detection to generate overall detection data (S32). The MCU 40 then detects one or more positions of the passive pointer 4 on the basis of the generated overall detection data (S33) and determines one or more touch positions from the one or more positions detected at S33 on the basis of the result of the most recently performed position detection of the active pen 2 and the area of the region in the touch surface 3a in which the change in the capacitance described above is equal to or greater than the predetermined value (S34). The MCU 40 that has determined the touch position outputs the coordinates (x, y) indicating the determined touch position to the host processor 32 illustrated in FIG. 2 (S35).

The MCU 40 then performs S22 to S27 described with reference to FIG. 8 to output the coordinates (x, y) indicating the pen position and the data included in the received data signal to the host processor 32 illustrated in FIG. 2 and ends the position detection process.

Figure 10:
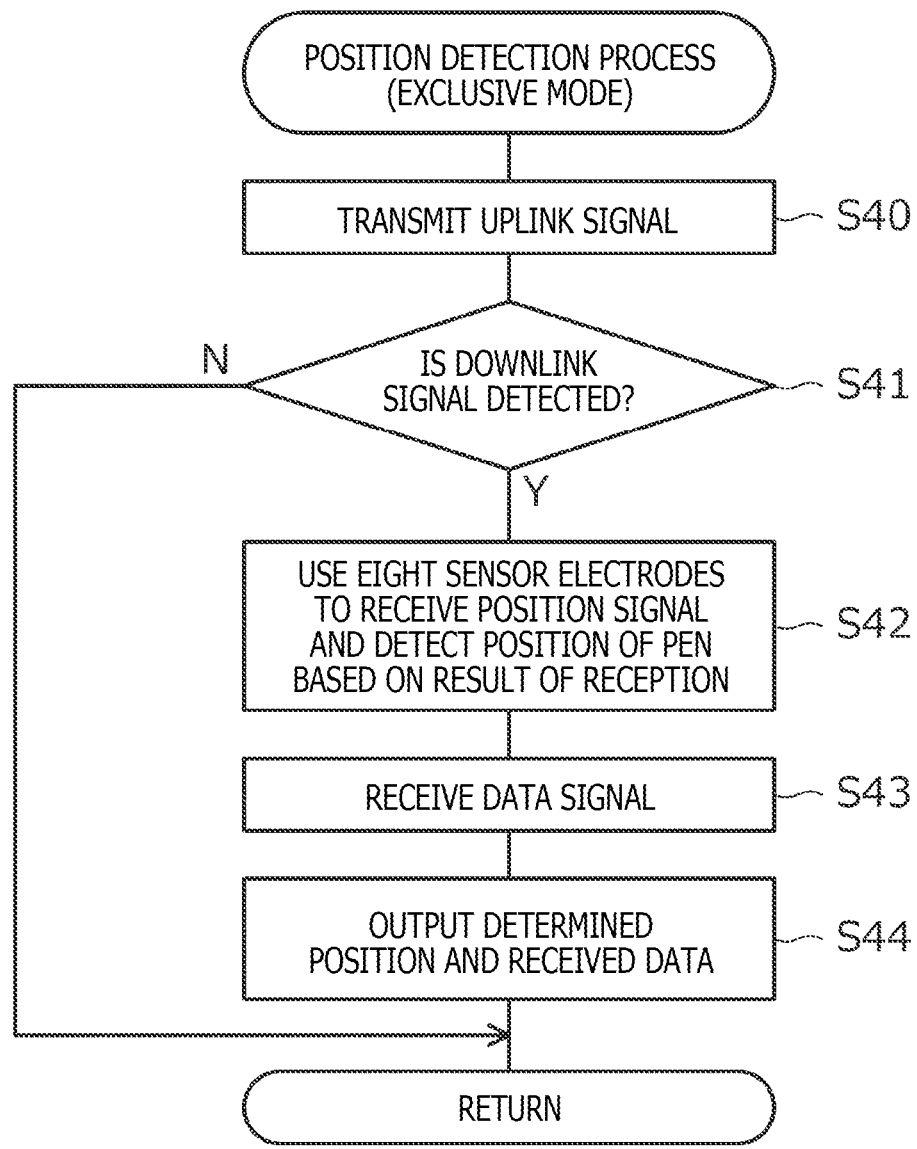
FIG. 10 depicts a process flow of the position detection process in an exclusive mode.

FIG. 10 depicts a process flow of the position detection process in the exclusive mode. The MCU 40 in this case transmits the uplink signal US without performing the process for detecting the position of the passive pointer 4 (S40). The MCU 40 determines whether or not the downlink signal DS is detected in response to the transmission (S41). The MCU 40 ends the position detection process if the MCU 40 determines that the downlink signal DS is not detected.

On the other hand, if the MCU 40 determines that the downlink signal DS is detected, the MCU 40 selects eight sensor electrodes 30X and 30Y on the basis of the pen position of the last time, uses the selected sensor electrodes 30X and 30Y to receive the position signal transmitted by the active pen 2, and detects the position of the pen on the basis of the result of the reception (S42). The MCU 40 then selects one sensor electrode 30X or 30Y on the basis of the pen position of the last time and uses the selected sensor electrode 30X or 30Y to receive the data signal transmitted by the active pen 2 (S43).

The MCU 40 outputs the coordinates (x, y) indicating the position detected at S42 and the data included in the data signal received at S43 to the host processor 32 illustrated in FIG. 2 (S44) and ends the position detection process. Note that the process as in S26 illustrated in FIGS. 8 and 9 is not performed in the exclusive mode, and the position detected at S42 is output as the pen position. This is because the position detection of the passive pointer 4 is not performed.

As described above, according to the input system 1 of the present embodiment, the sensor controller 31 operates in the SPT1 mode or the SPT2 mode (or the revised SPT2 mode) including the position detection of the passive pointer 4 until the pen tip of the active pen 2 comes into contact with the touch surface 3a. Therefore, the touch input can be performed when the active pen 2 is very close to the touch surface 3a, while the exclusive mode without the detection of the passive pointer 4 is used. In addition, the period of operation in the exclusive mode can be minimized, and the false detection prevention function (specifically, the process of S16 illustrated in FIG. 7 and the process of S26 illustrated in FIGS. 8 and 9) can be used as long as possible.

Although the preferred embodiment of the present disclosure has been described, the present disclosure is not limited to the embodiment in any way, and it is obvious that the present disclosure can be carried out in various modes without departing from the scope of the present disclosure.

For example, although the MCU 40 immediately releases the pairing and enters the SPT1 mode when the MCU 40 never detects the downlink signal DS in one position detection process in the embodiment (S6 and S7 of FIG. 6), the MCU 40 may release the pairing and enter the SPT1 mode for the first time when the MCU 40 does not detect the downlink signal DS for a predetermined number of times or for a predetermined time.

In addition, the MCU 40 enters the exclusive mode when the pen pressure value becomes a value larger than 0 in the embodiment (S9 of FIG. 6). However, after starting to detect the gesture operation of the passive pointer 4 (for example, pinch-out operation) in the SPT2 mode, the MCU 40 may not enter the exclusive mode while the detected gesture operation is continuing even when the pen pressure value becomes larger than 0, and the MCU 40 may enter the exclusive mode when the detected gesture operation is finished. In this way, even if, for example, the user accidentally brings the pen tip into contact with the touch surface 3a during the pinch-out operation, the touch input can be continued until the completion of the pinch-out operation.

What is claimed is:

1. A position detection method performed by a sensor controller connected to a sensor including a plurality of sensor electrodes, the method detecting, with use of the sensor, a position of a passive pointer that does not transmit a signal and a position of an active pen that transmits a pen signal from a pen electrode provided on an end of the active pen, the method comprising:

acquiring a pen pressure value indicating pressure applied to a pen tip of the active pen; and controlling an operation mode of the sensor controller according to the pen pressure value, wherein the controlling includes:

setting the operation mode of the sensor controller to a first operation mode of detecting, in time division, the position of the active pen and the position of the passive pointer on a panel surface when the pen pressure value indicates that the pen tip is not in contact with the panel surface, and setting the operation mode of the sensor controller to a second operation mode of detecting the position of the active pen on the panel surface and not detecting the position of the passive pointer on the panel surface when the pen pressure value indicates that the pen tip is in contact with the panel surface.

2. The position detection method according to claim 1, wherein, the acquiring includes decoding the pen signal received by the sensor to acquire the pen pressure value.

3. The position detection method according to claim 1, further comprising:

determining whether the pen signal is detected, wherein the controlling includes:

setting the operation mode of the sensor controller to any one of the first and second operation modes when the pen signal is detected by the determining, and setting the operation mode of the sensor controller to a third operation mode of detecting, in time division, the position of the active pen and the position of the passive pointer on the panel surface, with a detection frequency of the position of the passive pointer higher than that in the first operation mode, when the pen signal is not detected by the determining.

4. The position detection method according to claim 3, wherein the controlling includes:

in the third operation mode, controlling the sensor to perform a global scan using an entirety of the sensor, and in the first and second operation modes, controlling the sensor to perform a local scan using only part of the sensor.

5. The position detection method according to claim 1, wherein:

in the second operation mode, more of the sensor electrodes are used to detect the active pen than in the first operation mode.

6. The position detection method according to claim 1, wherein:

the controlling includes:

causing the sensor to select a first number of sensor electrodes in the first operation mode; and causing the sensor to select a second number of sensor electrodes in the second operation mode, the first number of sensor electrodes and the second number of sensor electrodes are different, and the sensor electrodes are selected one by one at time intervals corresponding to a number of sensor electrodes selected and used to detect the position of the active pen.

7. The position detection method according to claim 1, wherein the controlling includes:

controlling the sensor to start detecting a gesture operation of the passive pointer in the first operation mode, when the pen pressure value indicates that the pen tip is in contact with the panel surface the second operation mode is not entered while the gesture operation is detected; and controlling the sensor to enter the second operation mode when the gesture operation is finished.

8. The position detection method according to claim 1, wherein the controlling includes:

controlling the sensor controller to:

determine, from one or more detected positions of the active pen, the position of the active pen based on a result of detecting the passive pointer; and determine, from one or more detected positions of the passive pointer, the position of the passive pointer based on a result of detecting the active pen.

9. A sensor controller that uses a sensor including a plurality of sensor electrodes to detect a position of a passive pointer that does not transmit a signal and a position of an active pen that transmits a pen signal from a pen electrode provided on a front end part, the sensor controller comprising:

a processor; and a memory storing instructions that, when executed by the processor, cause the sensor controller to:

acquire a pen pressure value indicating pressure applied to a pen tip of the active pen;

enter a first operation mode of detecting, in time division, the position of the active pen and the position of the passive pointer on a panel surface when the pen pressure value indicates that the pen tip is not in contact with the panel surface; and enter a second operation mode of detecting the position of the active pen on the panel surface and not detecting the position of the passive pointer on the panel surface when the pen pressure value indicates that the pen tip is in contact with the panel surface.

10. The sensor controller according to claim 9, wherein the instructions, when executed by the processor, cause the sensor controller to:

decode the pen signal received by the sensor to acquire the pen pressure value.

11. The sensor controller according to claim 9, wherein the instructions, when executed by the processor, cause the sensor controller to:

determine whether the pen signal is detected;

enter any one of the first and second operation modes when the sensor controller determines that the pen signal is detected; and enter a third operation mode of detecting, in time division, the position of the active pen and the position of the passive pointer on the panel surface, with a detection frequency of the position of the passive pointer higher than that in the first operation mode, when the sensor controller determines that the pen signal is not detected.

12. The sensor controller according to claim 11, wherein:

in the third operation mode, a global scan is performed by an entirety of the sensor, and in the first and second operation modes, a local scan is performed by only part of the sensor.

13. The sensor controller according to claim 9, wherein:

in the second operation mode, detection of the active pen is performed by using more of the sensor electrodes than in the first operation mode.

14. The sensor controller according to claim 9, wherein:

a first number of sensor electrodes selected by the sensor controller in the first operation mode and a second number of sensor electrodes selected by the sensor controller in the second operation mode are different, and the sensor controller sequentially selects the sensor electrodes one by one at time intervals corresponding to a number of sensor electrodes selected to detect the position of the active pen.

15. The sensor controller according to claim 9, wherein:

the sensor controller, in operation, starts detecting a gesture operation of the passive pointer in the first operation mode, the sensor controller does not enter the second operation mode while the gesture operation is detected even when the pen pressure value indicates that the pen tip is in contact with the panel surface, and the sensor controller enters the second operation mode when the gesture operation is finished.

16. The sensor controller according to claim 9, wherein the instructions, when executed by the processor, cause the sensor controller to:

determine, from one or more detected positions of the active pen, the position of the active pen based on a result of detecting the passive pointer and determine, from one or more detected positions of the passive pointer, the position of the passive pointer based on a result of detecting the active pen.

* * * * *